Figure 1:
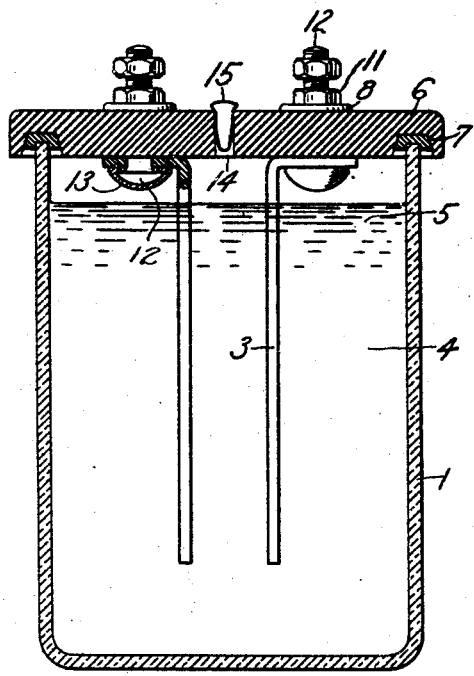

Jan. 3, 1928.

H. O. SIEGMUND ET AL

ELECTROLYTIC CELL

Filed Sept. 16, 1924

1,655,026

Inventors:
Humphreys O. Siegmund
Ben E. Brown
by E.W. Adams Att'y.

Patented Jan. 3, 1928.

1,655,026

UNITED STATES PATENT OFFICE.

HUMPHREYS O. SIEGMUND, OF WEST ORANGE, AND BEN E. BROWN, OF MOUNTAIN LAKES, NEW JERSEY, ASSIGNORS TO WESTERN ELECTRIC COMPANY, INCORPORATED, OF NEW YORK, N. Y., A CORPORATION OF NEW YORK.

ELECTROLYTIC CELL.

Application filed September 16, 1924. Serial No. 737,978.

This invention relates to electrolytic cells and has for an object an improved cover for use with electrolytic condensers and a sealing means therefor.

The invention has particular application to cells in which the electrodes are suspended from the cover and are only partially immersed in an electrolyte, although it is not limited to this type alone.

It is commonly known that the electrodes in such pieces of apparatus become corroded during use at the point where they protrude from the electrolyte into the air or other gases above the electrolyte. The rate of this corrosion varies somewhat with various electrolytes, their chemical composition, and their concentration. In time, corrosion reaches such a depth and so weakens the metal of the electrode that the electrode breaks off from its own weight or from jars or vibration to which it may be subjected. Some electrolytes, which are satisfactory as first supplied, in time become so concentrated by evaporation, that they attack and corrode the electrodes.

Furthermore, this corrosion of the electrodes particularly in electrolytic condensers, increases the current leakage and consequently, the watt loss.

One cause of such corrosion has been found to be the concentration of the surface layer of the electrolyte as a result of evaporation and formation of crystal precipitates on the electrodes at the junction of the electrolyte and supernatant gas. It has been found that this corrosion and incrustation of the electrodes at these points together with the usual current leakage caused by this corrosion may be greatly reduced if the electrodes are maintained in an atmosphere saturated at all times with water vapor so that no evaporation may take place. The invention provides, therefore, a simple and effective preventative of the harmful effects of corrosion above described by maintaining an atmosphere saturated with water vapor above the surface of the electrolyte.

One way of maintaining the condition of an atmosphere saturated with water vapor might be to use a cover hermetically sealed to the casing. Such a method however, would not allow for the escape of gases which are evolved during the operation of electrolytic condensers and in time therefore, a cell employing such a cover might develop serious leaks or explode due to the pressure created by these evolved gases. Another method might be to use a cover with but one small opening to allow for the escape of these gases. It has been found, however, that even a small opening allowed sufficient circulation of air for the slow evaporation of electrolyte.

A layer of high grade mineral oil over the surface of the electrolyte was found to be effective and yet did not contaminate the electrolyte. Such a layer retards corrosion by acting as an insulating area between the concentrated surface layer of the electrolyte and the supernatant gas, but does not completely eliminate incrustation which is itself objectionable as some electrolyte will creep through the oil along the electrode and will evaporate upon reaching the surface of the oil.

In accordance with this invention, a cover and cell are provided which allow the escape of evolved gases, but prevent the free circulation of air above the electrolyte. This has been found to hinder corrosion and incrustation to a high degree.

A further feature of the invention comprises a means of mounting the electrodes on the cover to render them resistant to corrosion and to maintain their connections with the exterior of the cell substantially air tight.

Figure 2:
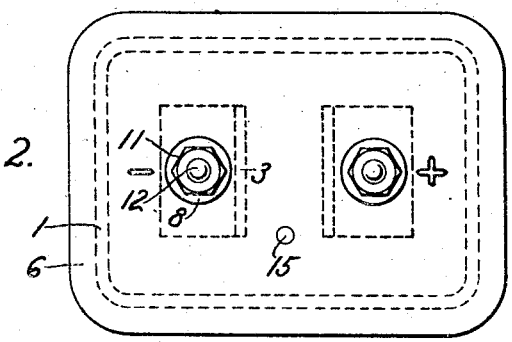

A fuller understanding of the invention will be had from the more detailed description to follow:

In the accompanying drawings in which similar parts are indicated in the different figures by the same reference characters, Fig. 1 is a cross sectional view in elevation of a cell embodying the invention. Fig. 2 is a top view of such a cell.

An electrolyte 4 is contained in an insulating casing 1 such as glass over which a cover 6 is sealed by means of a cold sealing composition 7, preferably contained in a groove in the cover. The sealing material may be introduced into this groove either before or after the cover is placed over the casing. A seal composed for example of paraffine is sufficiently porous to allow the escape under slight pressure of gases evolved during the operation of the cell, but will not allow the free circulation of gases between the interior and exterior of the cell.

Further, in case of an emergency in which an appreciable pressure may be created by the evolved gases, the "cold" seal will break and allow the cover to rise, thereby relieving the pressure, before the cell will actually explode. After such a breaking, the seal will be automatically formed again so that no substantial evaporation of electrolyte results. Actual practice has shown that such seals constitute a satisfactory and practical means of protecting the electrodes, extended tests over periods of many months having been made with no signs of corrosion of the electrodes.

Such tests have been made both with and without a layer of mineral oil 5 on the surface of the electrolyte and in neither case did any incrustation take place. Such a layer of oil however, while not entering into the sealing action, does in another manner serve a useful purpose, even in cells employing covers sealed to prevent any substantial escape of water vapor. With varying temperatures, the vapor pressure of water vapor changes, so that with sudden drops in temperature, "sweating" or the condensation of some of the water vapor, takes place above the electrolyte on the walls of those cells not having this layer of oil, due to a lowering of the temperature below the dew point. This continued wetting and drying comprising the "sweating" produces a dark undesirable oxide coloration over the metallic elements and, further, washes any foreign matter on the surface of exposed elements into the electrolyte. A layer of oil over the electrolyte surface prevents the rapid evaporation of water with sudden increases in temperature, as only that water which has slowly crept through the oil along the electrodes may evaporate and this amount is comparatively small.

This sealing composition further acts as a bearing between the cover and the casing.

Terminals 3 are set in the top of this cover 6. These terminals may be ordinarily tinned steel machine bolts 12 but over the heads of such bolts has been spun a cap 13, so that joints between the terminals and the electrodes may be made substantially air tight by tightening the nut 11 over the washer 8 and so that the exposed surface of these joints are resistant to corrosive action. Any corrosion resisting composition may compose the cap 13, though metals are preferable in that they are more effective as elements for mechanical joints. At least one of the surfaces in each joint, however, should further be composed of some relatively soft substance, so that the joint may be made substantially air tight with pressure. Aluminum is a satisfactory covering for use in electrolytic condensers since it is relatively soft, is corrosion resistant, and does not produce the deleterious action found between the electrolyte and nearly all other "soft" metals.

A hole 14 is provided in the cover for permitting the introduction of the oil layer after the electrodes have been immersed in the electrolyte so that they will not become coated with oil during the immersion process. A stopper 15 is fitted for the hole, this stopper also being sealed over with a cold sealing composition.

Any composition which will readily "cold flow", such as a high melting wax for example, is of course suitable for use as a sealing compound to prevent the free circulation of gases and yet to allow the escape of evolved gases. Felt or other fibrous material impregnated with a compound which will readily "cold flow" to form a seal, may similarly be employed. By the use of the term "cold flow" sealing composition as used herein is meant a sealing compound which is substantially a solid and which under pressure will flow or form itself around any given configuration. Such a composition may also be said to be affected by compression or tension but whose limit of elasticity is substantially zero, that is, it does not return to its original condition upon release of the pressure or tension force.

It will, of course, be appreciated that this invention is not to be restricted to electrolytic condensers as it is applicable to any apparatus in which a tight seal but not a hermetical one is desired. It is obvious that various modifications may be made within the scope of the claims.

We claim as our invention:

1. In electrical apparatus, a casing, a cover for said casing, electrodes suspended from said cover, terminals joined through said cover to said electrodes, and means for making the joints substantially resistant to corrosion, said means comprising aluminum caps covering said terminals.

2. In electrical apparatus, a casing, a cover for said casing, an electrolyte within said casing, electrodes suspended from said cover, terminals joined through said cover to said electrodes, means for making said joints substantially resistant to corrosion, means for maintaining an atmosphere saturated with water vapor above said electrolyte comprising a cover and a paraffin sealing composition between said cover and said casing, and further means for preventing sweating within said casing.

In witness whereof, we hereunto subscribe our names this 10th day of September, A. D. 1924.

HUMPHREYS O. SIEGMUND.
BEN E. BROWN.